United States Patent [19]

Zweegers

[11] 4,206,586
[45] Jun. 10, 1980

[54] MOWING MACHINE

[76] Inventor: Petrus W. Zweegers, Nieuwendijk 46, Geldrop, Netherlands

[21] Appl. No.: 902,403

[22] Filed: May 3, 1978

[30] Foreign Application Priority Data

May 13, 1977 [NL] Netherlands ................ 7705300

[51] Int. Cl.² ........................................... A01D 55/18
[52] U.S. Cl. .................................................. 56/295
[58] Field of Search .................. 56/295, 13.6, 6, 192

[56] References Cited

U.S. PATENT DOCUMENTS

| 3,555,798 | 1/1971 | Eder | 56/295 |
| 3,905,182 | 9/1975 | Geier | 56/295 |
| 3,965,658 | 6/1976 | van der Lely | 56/295 |

FOREIGN PATENT DOCUMENTS 2612381 10/1977 Fed. Rep. of Germany ............ 56/295

Primary Examiner—Jay N. Eskovitz
Attorney, Agent, or Firm—Edmund M. Jaskiewicz

[57] ABSTRACT

A mowing machine has two or more cutting members adapted to rotate about a vertical axis and each provided at the bottom with an annular skirt having cutting knives mounted thereon. Each skirt has a series of upwardly inclined sectors arranged circumferentially therearound. The mowing machine may also have an adjustable cutting height which is achieved by providing each upwardly inclined sector of the annular skirt with a number of circumferentially spaced knife fastening members. Due to the inclination of an annular collar these cutter fastening members are located at relatively different heights. The height of the cut may be determined by selecting the fastening members to which the cutting knives are to be attached.

7 Claims, 3 Drawing Figures

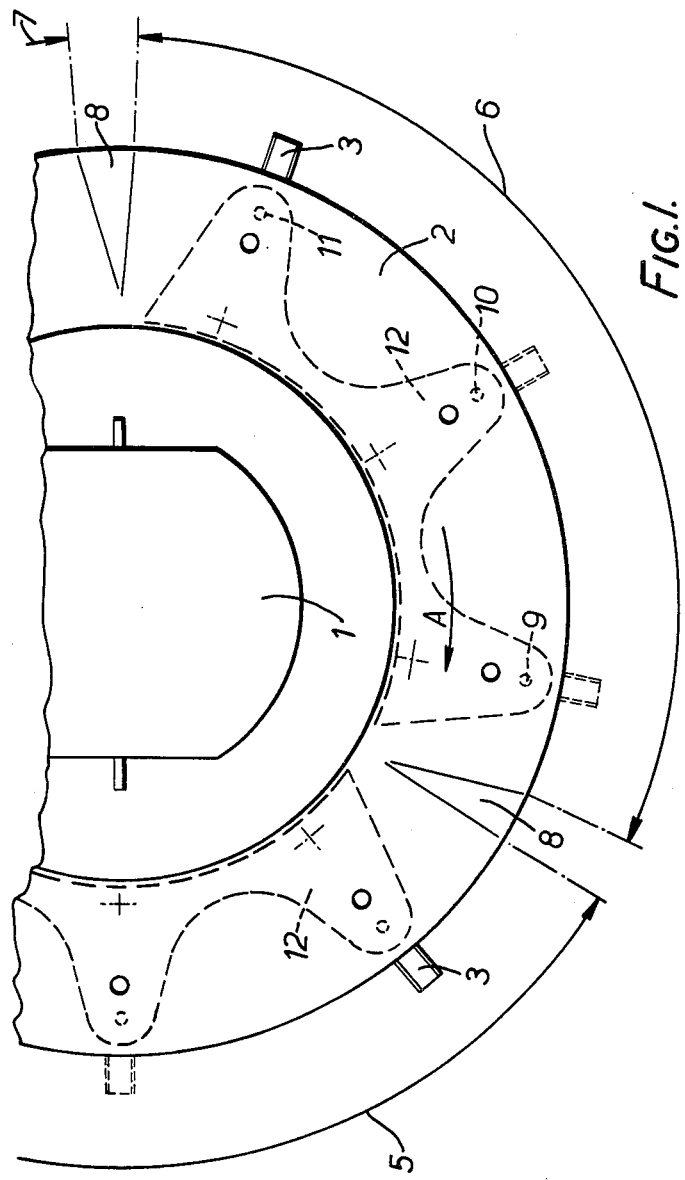

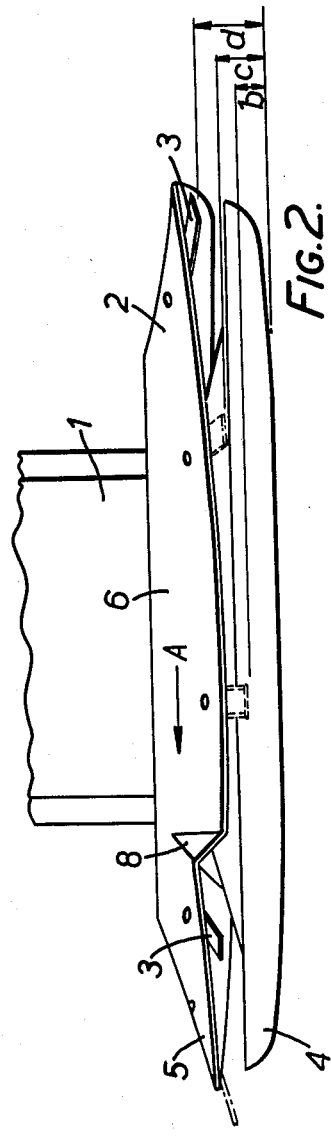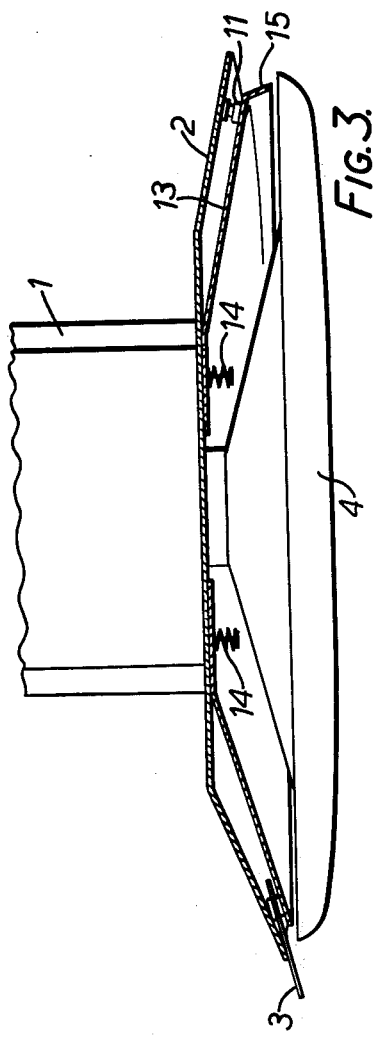

MOWING MACHINE

The invention relates to a mowing machine provided with cutting members adapted to rotate about a vertical axis and each provided at the bottom with an annular skirt carrying free-cutting knives.

It is an object of the invention to provide in such a mowing machine in proved operation, and in particular an improvement in the conveying of mown material from the front of the machine to the rear.

Accordingly the present invention provides, a mowing machine comprising two or more cutting members adapted to rotate about a vertical axis and each provided at the bottom with an annular skirt having cutting knives mounted thereon each skirt having a series of upwardly inclined sectors arranged circumferentially therearound.

With such a mowing machine it is furthermore desirable to have the possibility of adjusting the cutting height. According to a second aspect of the invention this is effectively achieved by providing each upwardly inclined sector of the annular skirt with a number of circumferentially spaced knife fastening members. Owing to the inclination of the annular collar these cutter fastening members are located at relatively different heights and thus height of cut adjustment may be made by selecting the fastening members to which the cutting knives are attached in accordance with prevailing conditions.

In order to promote a fuller understanding of the above and other aspects of the present invention, some embodiments will now be described, by way of example only, with reference to the accompanying drawings in which:

FIG. 1 is a plan view of a first embodiment of a cutting member intended for use in a mower in accordance with the invention.

FIG. 2 is a front view of the cutting member shown in FIG. 1.

FIG. 3 is a front view and partly a sectional view of a second embodiment of the cutting member.

The drawings illustrate some embodiments of the invention which may be fitted to a mowing machine of a type which is generally known per se and comprises a supporting beam provided with a plurality of cutting devices arranged side by side on the under side. Each cutting device includes a cutting member which is rotatable about a vertical axis, which is directed downwards from the supporting beam, and which is rotated by driving means accommodated in said supporting beam. The mowing machine comprises preferably at least one pair of cutting devices arranged to rotate in opposite senses and being capable of engaging the crop to be cut at the front of the machine and of depositing the cut crop behind the machine.

Each cutting member comprises a drum-shaped part 1 having an annular skirt 2 at the bottom thereof. At least the outermost part of the annular skirt 2 is preferably tapered in cross-section in the downward direction, so that the skirt 2 is generally frusto-conical. Beneath the annular skirt a plurality of cutting knives 3 are arranged in a manner to be described more fully hereinafter. At a distance beneath the cutting knives there is a supporting member 4 adapted to slide along the ground and is freely rotatable with respect to the rest of the cutting device.

In this embodiment of the invention at least the outermost part of the annular skirt is formed into such a shape that, in a circumferential direction, it forms a series of continuous, slightly upwardly inclined sections 5, 6, 7, which are connected one with the other through a short, abruptly downwardly sloping part 8 so that around the circumference a saw-tooth or ratchet like shape is formed. In the embodiment shown in FIGS. 1 and 2 each annular skirt has three sectors 5, 6 and 7 of the above kind, but this number may be higher or lower. In this embodiment the inclined sectors are formed by pressing in the material of the outermost conical part of the annular skirt so that this conical part of the annular skirt tapers downwards more sharply immediately adjacent the part 8 from the inside to the outside and gradually rises to the basic taper of the skirt at the next part 8. The inclined sectors 5, 6 and 7 are inclined upwardly in the direction opposite to the direction of rotation (arrow A in FIG. 2) so that, for example the inclined sector 6 starts on the left-hand side as seen in FIG. 2 at a small distance above the upper edge of the supporting member 4 and terminates at a considerably larger distance above the supporting member 4 on the right-hand side as seen in the Figure.

In one embodiment, beneath each inclined sector 5, 6 and 7 of each annular skirt there is arranged one cutter 3. According to a second aspect of the invention each inclined sector 5, 6 and 7 is provided with a number of circumferentially spaced cutter fastening members as indicated at 9, 10, 11, each of which fastening members may have the form of a supporting bolt passing through a hole in the cutter 3. Owing to the inclination of the parts 5, 6 and 7 in the circumferential direction the cutter fastening members 9, 10, 11 are located at relatively different heights. They are preferably distributed uniformly along the circumference of the annular skirt. By mounting one cutter 3 on each inclined sector 5, 6, 7 of the annular skirt on one of the cutter fastening members 9, 10 or 11 located at different heights, the height of each cutter knife 3 above the ground can be selected, that is to say, the most suitable cutting height can be chosen. The arrows b, c, d in FIG. 2 indicate the cutting height given by the three possible positions for mounting the cutters 3 on the cutter fastening members 9, 10 or 11.

In the embodiment shown in FIGS. 1 and 2 the cutter fastening members 9, 10 and 11 are formed by vertical supporting pins arranged on the top faces of profiled leaf springs 12. Beneath each upwardly inclined sector 5, 6 and 7 there is arranged a such leaf spring 12 having three outwardly extending tags, each of which holds a pin 9, 10, 11. The leaf spring 12 is secured in place by an inner part thereof beneath the annular skirt and the three tags provided with the pins can deflect resiliently away from the annular skirt so that a cutter 3 can be slipped onto a respective pin 9, 10 or 11.

In the embodiment shown in FIG. 3 the cutter fastening members 9, 10, 11 are formed by pins arranged on the top side of a frusto-conical intermediate ring 13. This intermediate ring 13 is held in contact with the bottom surface of the annular skirt by compression springs 14 distributed around a pitch circle as shown in FIG. 3. The outer edge 15 of the intermediate ring 13 is bent over downwardly and is formed, by circumferential wedge-shaped parts which partly close the wedge-shaped circumferential openings between the supporting member 4 and the upwardly inclined sectors 5, 6, 7 of the annular skirt 2. In this way penetration of dirt is minimized.

With the prior-art mower the crop cut at the front of the cutting members is engaged and conveyed to the rear by the drum-shaped parts 1 and the annular skirts 2 of a pair of cutting members rotating in opposite senses, the inclination of the conical annular skirt being conductive to a clean delivery of the cut crop. With the mower embodying the invention this effect is enhanced since the sectors of the annular skirts which are inclined upwards in the circumferential direction, impart an additional upwardly directed component to the cut crop. Therefore, the conicity of the annular skirts may be reduced and in certain cases it may even be dispensed with. Owing to the inclination of the sectors of the annular skirts the cutting height can be adjusted in a simple manner since several cutter knife fastening members may be provided on each upwardly inclined sector at different cutting heights. The wedge-shaped openings due to the upward inclination of the dish may be filled out by an intermediate ring with correspondingly profiled outer rim parts as discussed.

What I claim is:

1. A mowing machine comprising a cutting member rotatable around a substantially vertical axis of rotation in a direction of rotation, said cutting member comprising a central drum-shaped element coaxial to said axis of rotation and having a bottom, a substantially horizontal annular skirt attached at the bottom of said drum-shaped element, said skirt having a plurality of successive continuous circumferential sectors each of which is upwardly inclined opposite from the direction of rotation of the cutting member, and a cutting knife on each of said inclined sectors.

2. A mowing machine as claimed in claim 1 wherein the upwardly inclined sectors of the annular skirt are connected to one another by a short, abruptly downwardly sloping part of the skirt.

3. A mowing machine as claimed in claim 1 wherein the upwardly inclined sectors are formed in an outermost, frusto-conical part of the annular skirt.

4. A mowing machine as claimed in claim 1 wherein each upwardly inclined sector of the annular skirt has associated therewith a number of circumferentially spaced cutter fastening members.

5. A mowing machine as claimed in claim 4 wherein a respective cutting knife is mounted on one of the plurality of fastening members associated with each of said sectors.

6. A mowing machine as claimed in claim 1 and further comprising a generally dish-shaped supporting member arranged beneath the annular skirt of each cutting member, an intermediate ring member arranged between the annular skirt and the supporting member, the intermediate ring member having wedge-shaped outer rim parts which partly close the circumferential wedge-shaped openings between the supporting member and the inclined sectors of the annular skirt.

7. A mowing machine as claimed in claim 6 in which the intermediate ring member comprises a cutter carrying member and is held in contact with the bottom surface of the annular collar by resilient means.

* * * * *